(12) United States Patent
Avagliano et al.

(10) Patent No.: US 8,722,003 B1
(45) Date of Patent: May 13, 2014

(54) APPARATUS AND METHOD TO PRODUCE SYNTHETIC GAS

(71) Applicant: General Electric Company, Schenectady, NY (US)

(72) Inventors: Aaron John Avagliano, Houston, TX (US); John Saunders Stevenson, Yorba Linda, CA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 13/766,588

(22) Filed: Feb. 13, 2013

(51) Int. Cl.
*B01D 53/62* (2006.01)
*C01B 17/04* (2006.01)
*B01D 53/74* (2006.01)
*B01D 53/75* (2006.01)
*C01B 3/24* (2006.01)
*C10J 3/00* (2006.01)

(52) U.S. Cl.
CPC ............... *B01D 53/62* (2013.01); *C01B 17/04* (2013.01); *C01B 17/0404* (2013.01); *B01D 53/74* (2013.01); *B01D 53/75* (2013.01); *C01B 3/24* (2013.01); *C10J 3/00* (2013.01)
USPC ...................... 423/220; 423/573.1; 423/574.1; 422/168; 422/169; 422/170; 422/171; 422/187; 48/128; 48/198.3

(58) Field of Classification Search
CPC ........ B01D 53/62; B01D 53/74; B01D 53/75; C01B 17/04; C01B 17/0404; C01B 3/24; C10J 3/00

USPC ............ 423/220, 573.1, 574.1; 422/168–171, 422/187; 48/128, 198.3
See application file for complete search history.

(56) References Cited

U.S. PATENT DOCUMENTS

| 4,089,653 | A | * | 5/1978 | Ward, III | 96/5 |
|---|---|---|---|---|---|
| 4,130,403 | A | | 12/1978 | Cooley et al. | |
| 4,466,946 | A | | 8/1984 | Goddin, Jr. et al. | |
| 4,589,896 | A | | 5/1986 | Chen et al. | |
| 2006/0260189 | A1 | | 11/2006 | Reddy et al. | |
| 2007/0072949 | A1 | | 3/2007 | Ruud et al. | |
| 2007/0240565 | A1 | | 10/2007 | Doong et al. | |
| 2008/0112867 | A1 | | 5/2008 | Wei et al. | |

FOREIGN PATENT DOCUMENTS

| WO | 9220431 A1 | 11/1992 |
|---|---|---|
| WO | 2004089499 A2 | 10/2004 |

* cited by examiner

*Primary Examiner* — Timothy Vanoy
(74) *Attorney, Agent, or Firm* — Armstrong Teasdale LLP

(57) ABSTRACT

A system and method of capturing carbon dioxide from a flow of raw synthesis gas generated in a gasification system are provided. The carbon capture system includes an acid gas removal subsystem configured to generate a flow of reduced acid gas content syngas, a flow of hydrogen sulfide ($H_2S$) lean gas, and a first flow of $H_2S$-rich gas from a stream of particulate-free raw syngas, an $H_2S$ selective membrane separator, said $H_2S$ selective membrane separator configured to separate the flow of $H_2S$-lean gas from the AGR into a second flow of $H_2S$-rich gas and a flow of $CO_2$ gas, and a sulfur recovery unit (SRU) coupled in flow communication with said $H_2S$ membrane separator downstream of said membrane separator, said SRU configured to generate a flow of elemental sulfur and a flow of tail gas from the first flow of $H_2S$-rich gas and the second flow of $H_2S$-rich gas.

20 Claims, 6 Drawing Sheets

APPARATUS AND METHOD TO PRODUCE SYNTHETIC GAS

BACKGROUND OF THE INVENTION

The field of the invention relates generally to gasification plants, and more particularly, to methods and apparatus for improving synthetic gas production with a gasification plant by separating hydrogen sulfide and carbon dioxide from a flow of synthetic gas.

At least some known gasification plants include a gasification system that is integrated with at least one power-producing turbine system, thereby forming an integrated gasification combined-cycle (IGCC) power generation plant. For example, known gasification systems convert a mixture of fuel, air or oxygen, steam, and/or $CO_2$ into a synthetic gas, or "syngas". The syngas is channeled to the combustor of a gas turbine engine, which powers a generator that supplies electrical power to a power grid. Exhaust from at least some known gas turbine engines is supplied to a heat recovery steam generator (HRSG) that generates steam for driving a steam turbine. Power generated by the steam turbine also drives an electrical generator that provides electrical power to the power grid.

At least some known gasification systems associated with IGCC plants initially produce a "raw" syngas fuel which includes carbon monoxide (CO), hydrogen ($H_2$), carbon dioxide ($CO_2$), carbonyl sulfide (COS), and hydrogen sulfide ($H_2S$). $CO_2$, COS, and $H_2S$ are typically referred to as acid gases. Acid gas is generally removed from the raw syngas fuel to produce a "clean" syngas fuel for combustion within the gas turbine engines.

BRIEF DESCRIPTION OF THE INVENTION

In one embodiment, a carbon capture system includes an acid gas removal (AGR) subsystem configured to generate a flow of reduced acid gas content syngas, a flow of hydrogen sulfide (H2S) lean gas, and a first flow of H2S-rich gas from a stream of particulate-free raw syngas, an H2S selective membrane separator, said H2S selective membrane separator oriented downstream from said AGR subsystem, said H2S selective membrane separator configured to separate the flow of H2S-lean gas from the AGR into a second flow of H2S-rich gas and a flow of CO2 gas, and a sulfur recovery unit (SRU) coupled in flow communication with said $H_2S$ membrane separator downstream of said membrane separator, said SRU configured to generate a flow of elemental sulfur and a flow of tail gas from the first flow of $H_2S$-rich gas and the second flow of $H_2S$-rich gas.

In another embodiment, a method of capturing carbon dioxide ($CO_2$) from a flow of raw synthesis gas generated in a gasification system includes receiving the flow of raw synthesis gas comprising $CO_2$ at an inlet of at least one of a $H_2S$ selective membrane separator and an acid gas removal unit (AGR), separating relatively clean synthesis gas from at least one of the flow of raw synthesis gas and a flow of $H_2S$-lean synthesis gas using the AGR, separating the flow of at least one of raw synthesis gas and acid gas into a flow of $H_2S$-rich gas and a flow of $H_2S$-lean gas using a $H_2S$ selective membrane separator, and separating sulfur from the $H_2S$-rich gas using a sulfur recovery unit (SRU).

In yet another embodiment, a gasification system includes a gasifier configured to generate a flow of fuel gas comprising acid gas, an acid gas removal subsystem (AGR) coupled in flow communication with said gasifier and configured to remove at least a portion of acid gas from the flow of fuel gas, a membrane separator coupled in flow communication with said acid gas removal subsystem, said membrane separator oriented at least one of upstream and downstream in a direction of the flow of fuel gas from said acid gas removal subsystem, said membrane separator configured to separate hydrogen sulfide ($H_2S$) gas from the flow of fuel gas to generate a flow of $H_2S$-rich gas and a flow of $H_2S$-lean gas, and a sulfur recovery unit (SRU) coupled in flow communication with said membrane separator downstream of said membrane separator, said SRU configured to remove sulfur from the flow of $H_2S$-rich gas.

BRIEF DESCRIPTION OF THE DRAWINGS

FIG. 1 is a schematic diagram of a gasification system in accordance with an exemplary embodiment of the present invention;

FIG. 2 is a schematic block diagram of an arrangement of components of the gasification system shown in FIG. 1 in accordance with an exemplary embodiment of the present invention;

FIG. 3 is a schematic block diagram of an arrangement of components of the gasification system shown in FIG. 1 in accordance with an exemplary embodiment of the present invention where tail gas is recycled in the gasification system;

FIG. 4 is a schematic block diagram of another arrangement of components of the gasification system shown in FIG. 1 in accordance with an exemplary embodiment of the present invention; and FIG. 5 is a schematic block diagram of another arrangement of components of the gasification system shown in FIG. 1 in accordance with an exemplary embodiment of the present invention.

FIG. 6 is a schematic block diagram of an arrangement of components of the gasification system shown in FIG. 1 in accordance with another exemplary embodiment of the present invention.

DETAILED DESCRIPTION OF THE INVENTION

The following detailed description illustrates embodiments of the invention by way of example and not by way of limitation. It is contemplated that the invention has general application to capturing carbon dioxide ($CO_2$) from a flow of gas in industrial, commercial, and residential applications.

As used herein, an element or step recited in the singular and proceeded with the word "a" or "an" should be understood as not excluding plural elements or steps, unless such exclusion is explicitly recited. Furthermore, references to "one embodiment" of the present invention are not intended to be interpreted as excluding the existence of additional embodiments that also incorporate the recited features.

As used herein, the term "selective" when used in reference to membranes describes the propensity of the membrane to permit the transfer through the membrane of one component of a mixture to which the membrane is exposed relative to other components of the mixture. Thus, a $CO_2$-selective membrane is one which preferentially permits the transfer of $CO_2$ through the membrane relative to the transfer of other components, for example, $H_2S$ and $H_2$, of the mixture.

Figure 1:
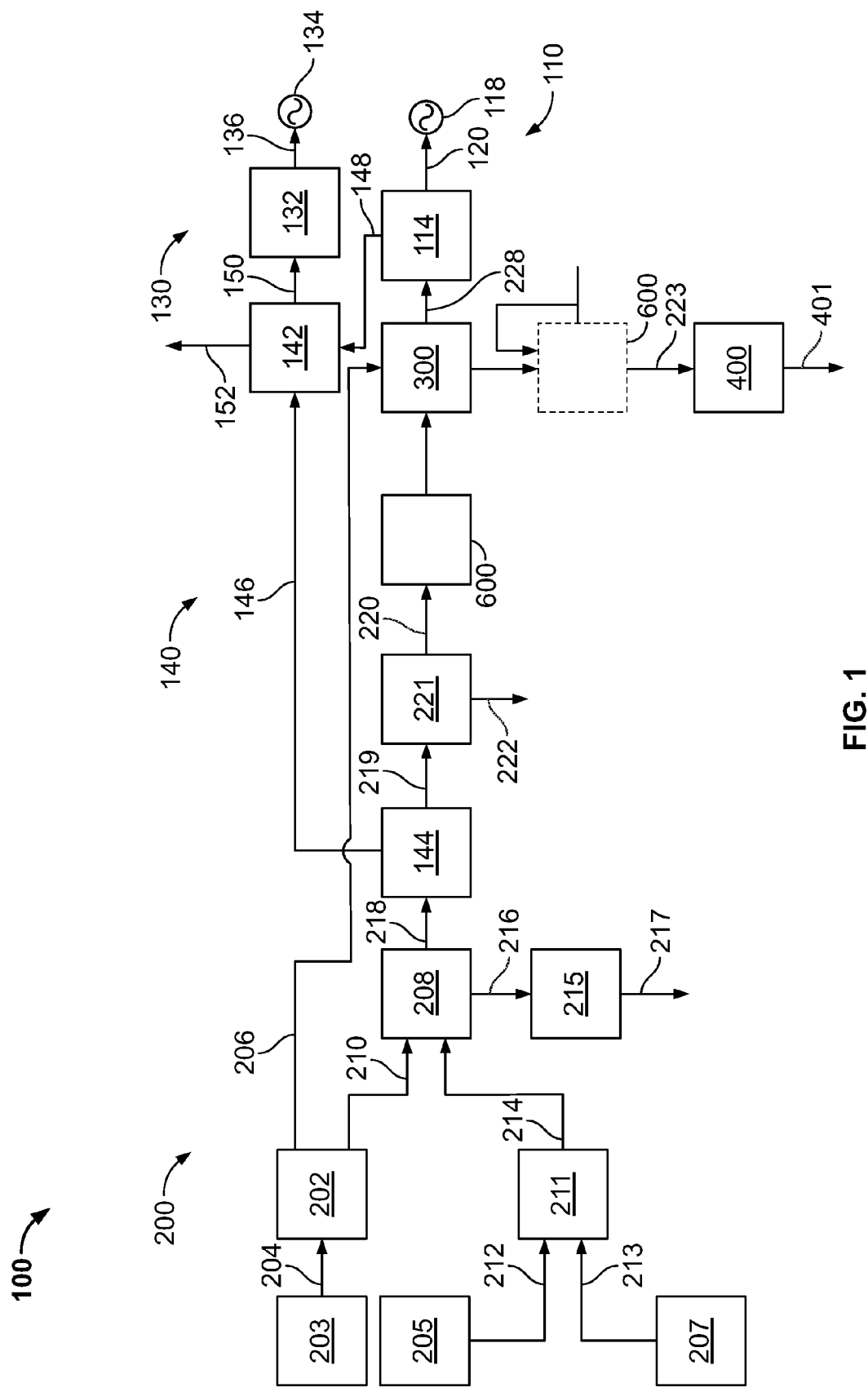
FIGS. 1-6 show exemplary embodiments of the method and apparatus described herein.

FIG. 1 is a schematic diagram of an integrated gasification combined-cycle (IGCC) power generation plant 100 in accordance with an exemplary embodiment of the present invention. In the exemplary embodiment, IGCC power generation plant 100 includes a gas turbine engine 110. A gas turbine 114 is rotatably coupled to a first electrical generator 118 via a first rotor 120. Gas turbine 114 is coupled in flow communication with at least one fuel source and at least one air source (both described in more detail below) and is configured to receive the fuel and air from the fuel source and the air source, respectively. Gas turbine 114 is configured to mix air and fuel, produce hot combustion gases (not shown), and convert the heat energy within the gases to rotational energy. The rotational energy is transmitted to generator 118 via rotor 120, wherein generator 118 is configured to facilitate converting the rotational energy to electrical energy (not shown) for transmission to at least one load, including, but not limited to, an electrical power grid (not shown).

IGCC power generation plant 100 also includes a steam turbine engine 130. In the exemplary embodiment, engine 130 includes a steam turbine 132 rotatably coupled to a second electrical generator 134 via a second rotor 136.

IGCC power generation plant 100 further includes a steam generation system 140. In the exemplary embodiment, system 140 includes at least one heat recovery steam generator (HRSG) 142 that is coupled in flow communication with at least one heat transfer apparatus 144 via at least one heated boiler feedwater conduit 146. HRSG 142 is configured to receive boiler feedwater (not shown) from apparatus 144 via conduit 146 for facilitating heating the boiler feedwater into steam. HRSG 142 is also configured to receive exhaust gases from turbine 114 via an exhaust gas conduit 148 to further facilitate heating the boiler feedwater into steam. HRSG 142 is coupled in flow communication with turbine 132 via a steam conduit 150. Excess gasses and steam are exhausted from HRSG 142 to the atmosphere via stack gas conduit 152.

Conduit 150 is configured to channel steam from HRSG 142 to turbine 132. Turbine 132 is configured to receive the steam from HRSG 142 and convert the thermal energy in the steam to rotational energy. The rotational energy is transmitted to generator 134 via rotor 136, wherein generator 134 is configured to facilitate converting the rotational energy to electrical energy (not shown) for transmission to at least one load, including, but not limited to, the electrical power grid. The steam is condensed and returned as boiler feedwater via a condensate conduit (not shown).

IGCC power generation plant 100 also includes a gasification system 200. In the exemplary embodiment, gasification system 200 includes at least one air separation unit (ASU) 202 coupled in flow communication with an air source 203 via an air conduit 204. Air source 203 may include, but is not limited to, dedicated air compressors and compressed air storage units. ASU 202 is configured to separate air into oxygen ($O_2$), nitrogen ($N_2$), and other components. The other components are released via a vent (not shown). $N_2$ is channeled to gas turbine 114 via an $N_2$ conduit 206 to facilitate combustion.

Gasification system 200 includes a gasification reactor 208 that is coupled in flow communication with ASU 202 and is configured to receive the $O_2$ stream channeled from ASU 202 via an $O_2$ conduit 210. System 200 also includes a coal grinding and slurrying unit 211. Unit 211 is coupled in flow communication with a coal source 205 and a water source 207 via a coal supply conduit 212 and a water supply conduit 213, respectively. Unit 211 is configured to mix the coal and water to form a coal slurry stream that is channeled to reactor 208 via a coal slurry conduit 214. Although illustrated showing coal as a fuel supply, any carboneous material may be used as fuel for gasification system 200.

Reactor 208 is configured to receive the coal slurry stream and the $O_2$ stream via conduits 214 and 210, respectively. Reactor 208 is also configured to facilitate production of a hot, raw synthetic gas (syngas) stream. The raw syngas includes carbon monoxide (CO), hydrogen ($H_2$), carbon dioxide ($CO_2$), carbonyl sulfide (COS), and hydrogen sulfide ($H_2S$). While $CO_2$, COS, and $H_2S$ are typically collectively referred to as acid gases, or acid gas components of the raw syngas, hereon, $CO_2$ will be discussed separately from the remaining acid gas components. Moreover, reactor 208 is also configured to produce a hot slag stream as a by-product of the syngas production. The slag stream is channeled to a slag handling unit 215 via a hot slag conduit 216. Unit 215 is configured to quench and break up the slag into small slag pieces wherein a slag removal stream is produced and channeled through conduit 217.

Reactor 208 is coupled in flow communication with heat transfer apparatus 144 via a hot syngas conduit 218. Apparatus 144 is configured to receive the hot, raw syngas stream and transfer at least a portion of the heat to HRSG 142 via conduit 146. Subsequently, apparatus 144 produces a cooled raw syngas stream (not shown) that is channeled to a scrubber and low temperature gas cooling (LTGC) unit 221 via a syngas conduit 219. LTGC 221 is configured to remove particulate matter entrained within the raw syngas stream and facilitate removal of the removed matter via a fly ash conduit 222. LTGC 221 is also configured to further cool the raw syngas stream. Moreover, LTGC 221 may be configured to include one or more shift conversion reactors that convert CO and $H_2O$ to $CO_2$ and $H_2$, and may convert a portion of any COS to $H_2S$ and $CO_2$. LTGC 221 may be configured to include a COS hydrolysis reactor to convert at least a portion of COS in the raw syngas stream to $H_2S$ and $CO_2$ via hydrolysis. Further, LTGC 221 may be configured to include one or more superheaters to ensure that the raw syngas product is maintained above a dew point.

System 200 further includes an acid gas removal (AGR) subsystem 300 that is coupled in flow communication with LTGC 221 and is configured to receive the cooled raw syngas stream via a raw syngas conduit 220. AGR 300 is also configured to facilitate removal of at least a portion of acid components (not shown) from the raw syngas stream as discussed further below. Such acid gas components include, but are not limited to, $CO_2$, COS, and $H_2S$. AGR 300 is further configured to facilitate separation of at least some of the acid gas components into components that include, but are not limited to, $CO_2$, COS, and $H_2S$.

In various embodiments, AGR 300 operates using for example, but not limited to, physical sorbents, glycol-based solvents, or Rectisol® or Ryan-Holmes®; those based on chemical sorbents, such as MEA, MDEA, TEA, etc.; or other AGR technologies, such as a non-specific acid gas separation membrane or a $CO_2$-specific separation membrane. AGR 300 may also incorporate using a solvent such as TEA or MDEA to produce a high pressure, potentially high purity $CO_2$ stream from AGR 300 thereby reducing downstream compression requirements associated with $CO_2$ capture for sequestration. AGR 300 may also include a dehydration step to remove water, and/or oxidation step downstream of AGR for generating a $CO_2$ stream with appropriate cooling and a knock-out drum (KOD) depending on the end use for the $CO_2$.

Moreover, AGR 300 is coupled in flow communication with a sulfur recovery unit (SRU) 400 via a conduit 223. SRU 400 is also configured to receive and facilitate separation of at least some of the acid gas components into components that include, but are not limited to, $CO_2$, COS, and $H_2S$ and to reconvert the sulfur-bearing components into elemental sulfur for removal through a conduit 401. Furthermore, AGR 300 and/or SRU 400 may be configured to channel a final integrated gas stream (not shown) to reactor 208, such as via AGR 300 and a final integrated gas stream conduit 224. The final integrated gas stream includes predetermined concentrations of $CO_2$, COS, and $H_2S$ that result from previous integrated gas streams (not shown) as discussed further below. In various embodiments, SRU 400 may be implemented using any of a Claus process, a Direct Sulfur Recovery Process (DSRP), Sulfuric Acid, Direct Oxidation, Sulfatreat Direct Oxidation, Sulfatreat, and an RTI Zn-based sulfur removal process.

AGR 300 is coupled in flow communication with reactor 208 via conduit 224 wherein the final integrated gas stream is channeled to predetermined portions of reactor 208. The separation and removal of such $CO_2$, COS, and $H_2S$ via AGR 300 and SRU 400 facilitates producing a clean syngas stream (not shown) that is channeled to gas turbine 114 via a clean syngas conduit 228.

In operation, air separation unit 202 receives air via conduit 204. The air is separated into $O_2$, $N_2$, and other components. The other components are vented via a vent, the $N_2$ is channeled to turbine 114 via conduit 206 and the $O_2$ is channeled to gasification reactor 208 via conduit 210. Also, in operation, coal grinding and slurrying unit 211 receives coal and water via conduits 212 and 213, respectively, forms a coal slurry stream and channels the coal slurry stream to reactor 208 via conduit 214.

Reactor 208 receives the $O_2$ via conduit 210, coal via conduit 214, and the final integrated gas stream from AGR 300 via conduit 224. Reactor 208 facilitates production of a hot raw syngas stream that is channeled to apparatus 144 via conduit 218. The slag by-product that is formed in reactor 208 is removed via slag handling unit 215 and conduits 216 and 217. Apparatus 144 facilitates cooling the hot raw syngas stream to produce a cooled raw syngas stream that is channeled to scrubber and LTGC 221 via conduit 219 wherein particulate matter is removed from the syngas via conduit 222, the syngas is cooled further, and at least a portion of COS is converted to $H_2S$ and $CO_2$ via hydrolysis. Such cooling of the raw syngas allows recovery of the thermal energy in the raw syngas, such as in the form of heated boiler feed water. Moreover, the recovered thermal energy may be used in other processes as well, such as, but not limited to, shift or other reactors, such as COS hydrolysis or methanation processes, and heating of the inlet stream into the membrane unit to protect against condensation in the membranes The cool raw syngas stream is channeled to AGR 300 wherein acid gas components are substantially removed such that a clean syngas stream is formed and channeled to gas turbine 114 via conduit 228.

Moreover, in operation, at least a portion of the acid components removed from the syngas stream may be channeled to SRU 400 via conduit 223 wherein acid components are removed.

Further, in operation, turbine 114 receives $N_2$ and clean syngas via conduits 206 and 228, respectively. Turbine 114 combusts the syngas fuel, produces hot combustion gases and channels the hot combustion gases to induce rotation of turbine 114 which subsequently rotates first generator 118 via rotor 120.

At least a portion of the heat removed from the hot syngas via heat transfer apparatus 144 is channeled to HRSG 142 via conduit 146 wherein the heat boils water to form steam. The steam is channeled to steam turbine 132 via conduit 150 and induces a rotation of turbine 132. Turbine 132 rotates second generator 134 via second rotor 136.

An $H_2S$ selective membrane separator 600 includes a membrane used to separate a flow of gas into a flow of $H_2S$-rich gas and a flow of $H_2S$-lean gas. In one embodiment, $H_2S$ selective membrane separator 600 is positioned between LTGC 221 and AGR 300. In another embodiment, $H_2S$ selective membrane separator 600 is positioned between AGR 300 and SRU 400.

Figure 2:
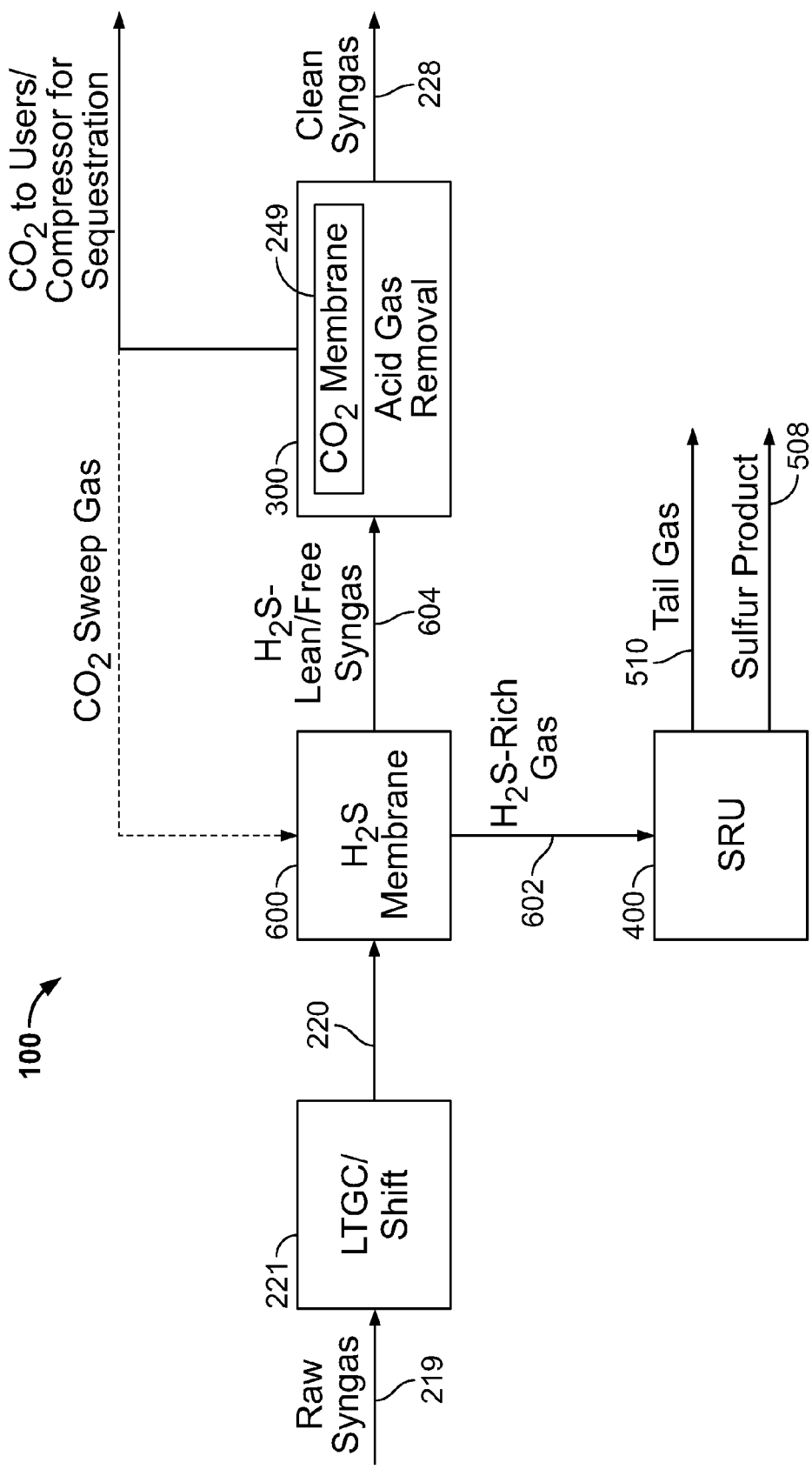

FIG. 2 is a schematic block diagram of another arrangement of components of IGCC power generation plant 100 in accordance with an exemplary embodiment of the present invention. In this exemplary embodiment, the cooled raw syngas stream from LTGC 221 is channeled to an $H_2S$ selective membrane separator 600 before being channeled to AGR 300. A flow of $H_2S$-rich gas 602, which passes through a membrane (not shown) within $H_2S$ selective membrane separator 600 is directed to SRU 400 where sulfur 508 and tail gas 510 are separated and directed to downstream systems for further processing. A flow 604 of $H_2S$-lean gas, also comprising syngas is directed to AGR 300, where $CO_2$ is separated from the flow of $H_2S$-lean gas and recycled for use elsewhere in IGCC power generation plant 100, prepared for sequestration, and/or used as a sweep gas for $H_2S$ selective membrane separator 600. Using a sweep gas applied to the low pressure side of the membrane in $H_2S$ selective membrane separator 600 limits $CO_2$ losses through the $H_2S$ membrane and increases H2S separation efficiency. In various embodiments, $N_2$ and/or clean syngas are also used for $H_2S$ selective membrane separator 600 sweep. In one embodiment, a $CO_2$ selective membrane 249 is used to facilitate separating the cooled $H_2S$-lean syngas entering AGR 300 from conduit 220 into a clean syngas stream and an acid gas stream.

In various embodiments, LTGC 221 may include a shift/COS hydrolysis portion that converts COS to $H_2S$.

Figure 3:
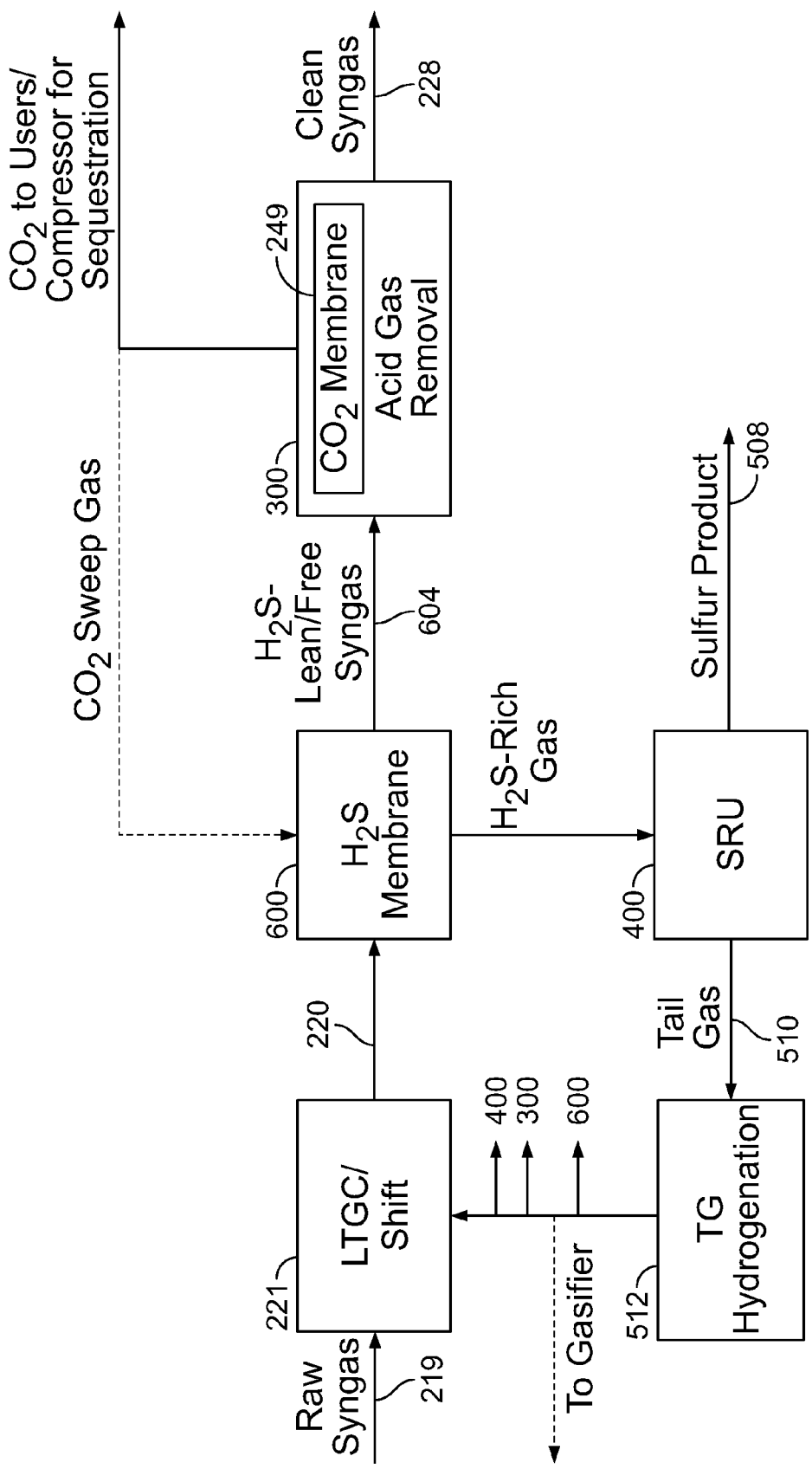

FIG. 3 is a schematic block diagram of another arrangement of components of IGCC power generation plant 100 in accordance with an exemplary embodiment of the present invention. In this embodiment, flow of tail gas 510 is channeled to a tail gas hydrogenation unit 512 where flow of tail gas 510 is treated for recycling in IGCC power generation plant 100. For example, the treated tail gas 514 may be recycled to reactor 208, LTGC 221, AGR 300, SRU 400, and/or $H_2S$ selective membrane separator 600. In various embodiments, raw syngas, syngas from $H_2S$ selective membrane separator 600, and syngas from AGR 300 is used for the tail gas hydrogenation process. In one embodiment, a $CO_2$ selective membrane 249 is used to separate the syngas and acid gas from the cooled $H_2S$-lean syngas entering AGR 300 from conduit 604.

Figure 4:
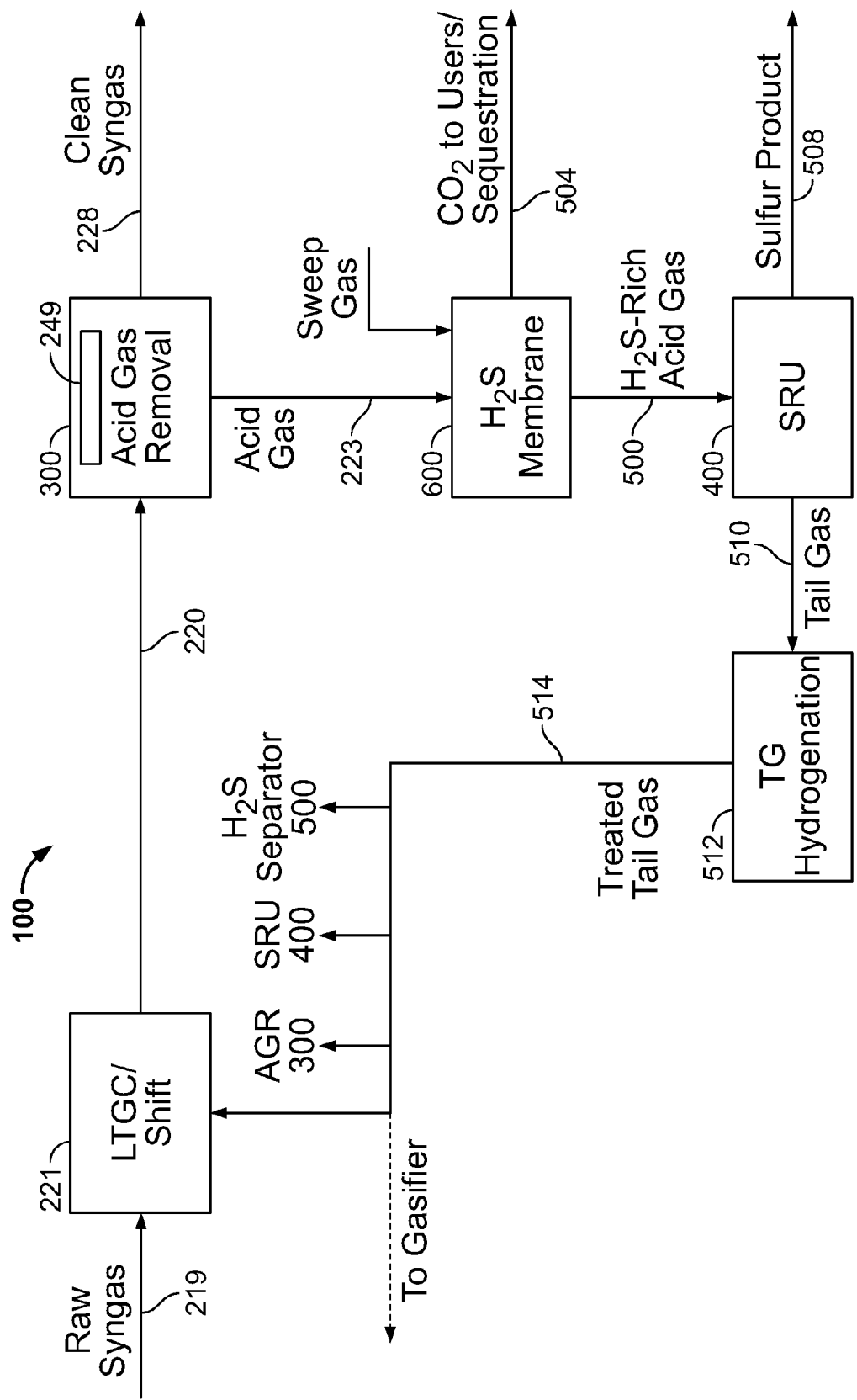

FIG. 4 is a schematic block diagram of an arrangement of components of IGCC power generation plant 100 in accordance with another exemplary embodiment of the present invention. In this embodiment, $H_2S$ selective membrane separator 600 is positioned in flow communication between AGR 300 and SRU 400. In one embodiment, a $CO_2$ selective membrane 249 is used to facilitate separating the cooled $H_2S$-lean syngas entering AGR 300 from conduit 220 into a clean syngas stream and an acid gas stream. Gases exiting AGR 300 comprise acid gas including $CO_2$, COS, and $H_2S$ in proportions based on process parameters such as, but not limited to, fuel used in IGCC power generation plant 100, process temperatures, and efficiency of the shift reactor portion of LTGC 221. $H_2S$ selective membrane separator 600 permits $H_2S$ to diffuse through a membrane while substantially preventing other gases from diffusing through the membrane. Acid gas entering $H_2S$ selective membrane separator 600 through conduit 223 is separated into a flow of $H_2S$-rich gas, which exits $H_2S$ selective membrane separator 600 through conduit 500, and into a flow of $H_2S$-lean gas, which exits $H_2S$ selective membrane separator 600 through a conduit 504. A portion of the flow of $H_2S$-lean gas is recycled back to an upstream side of $H_2S$ selective membrane separator 600 to facilitate reducing an amount of $CO_2$ losses through the membrane.

The flow of $H_2S$-rich gas is channeled to SRU 400, which separates the flow of $H_2S$-rich gas into a flow of elemental sulfur 508 and a flow of tail gas 510, which still comprises $CO_2$, $SO_2$, and $H_2S$. The flow of tail gas 510 is channeled to a hydrogenation unit 512 where flow of tail gas 510 is treated for recycling in IGCC power generation plant 100. For example, the treated tail gas 514 may be recycled to reactor 208, LTGC 221, AGR 300, SRU 400, and/or $H_2S$ selective membrane separator 600.

Figure 5:
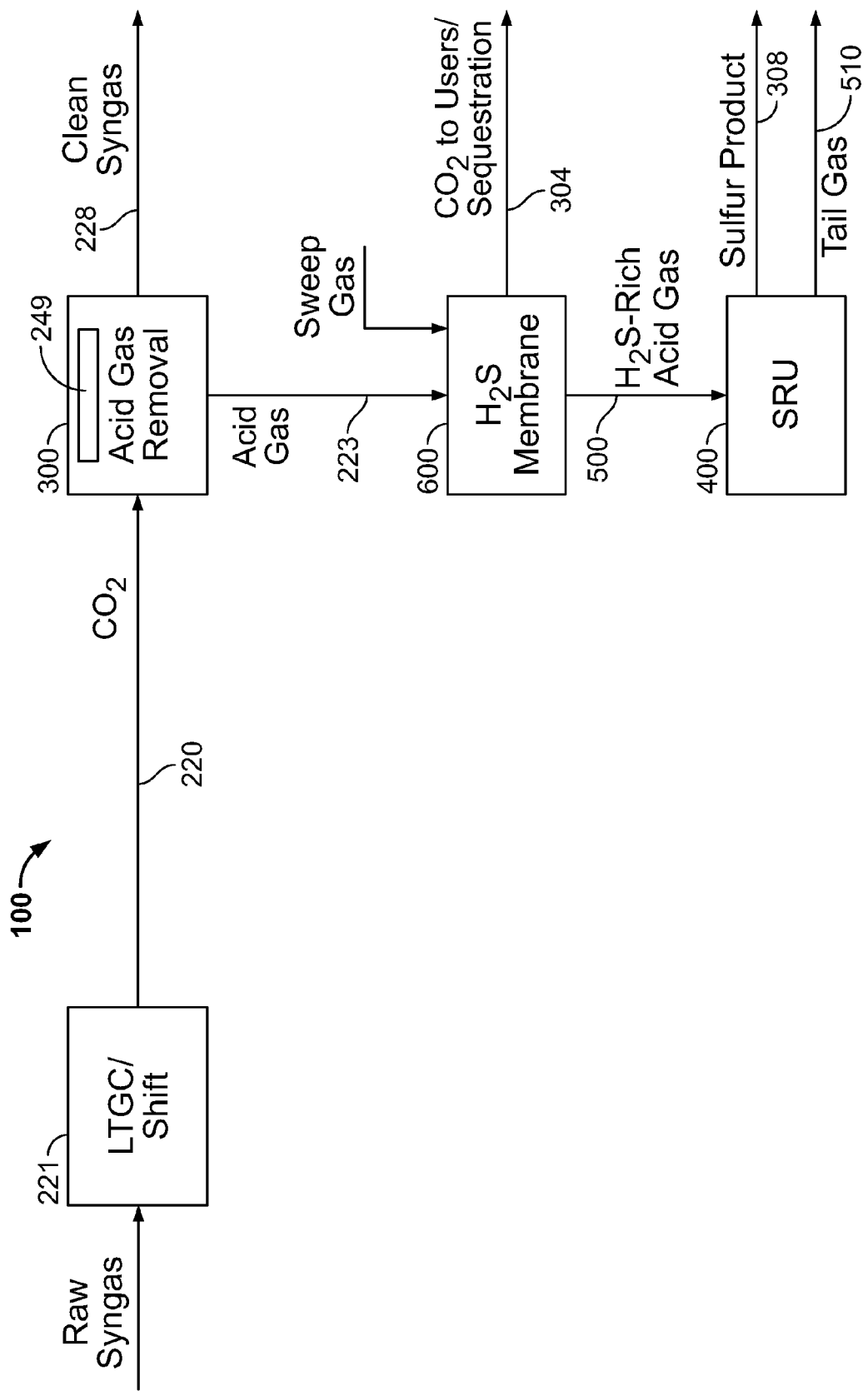

FIG. 5 is a schematic block diagram of an arrangement of components of IGCC power generation plant 100 in accordance with an exemplary embodiment of the present invention where tail gas is not recycled in IGCC power generation plant 100. Rather, flow of tail gas 510 is channeled to another system (not shown) for processing.

Figure 6:
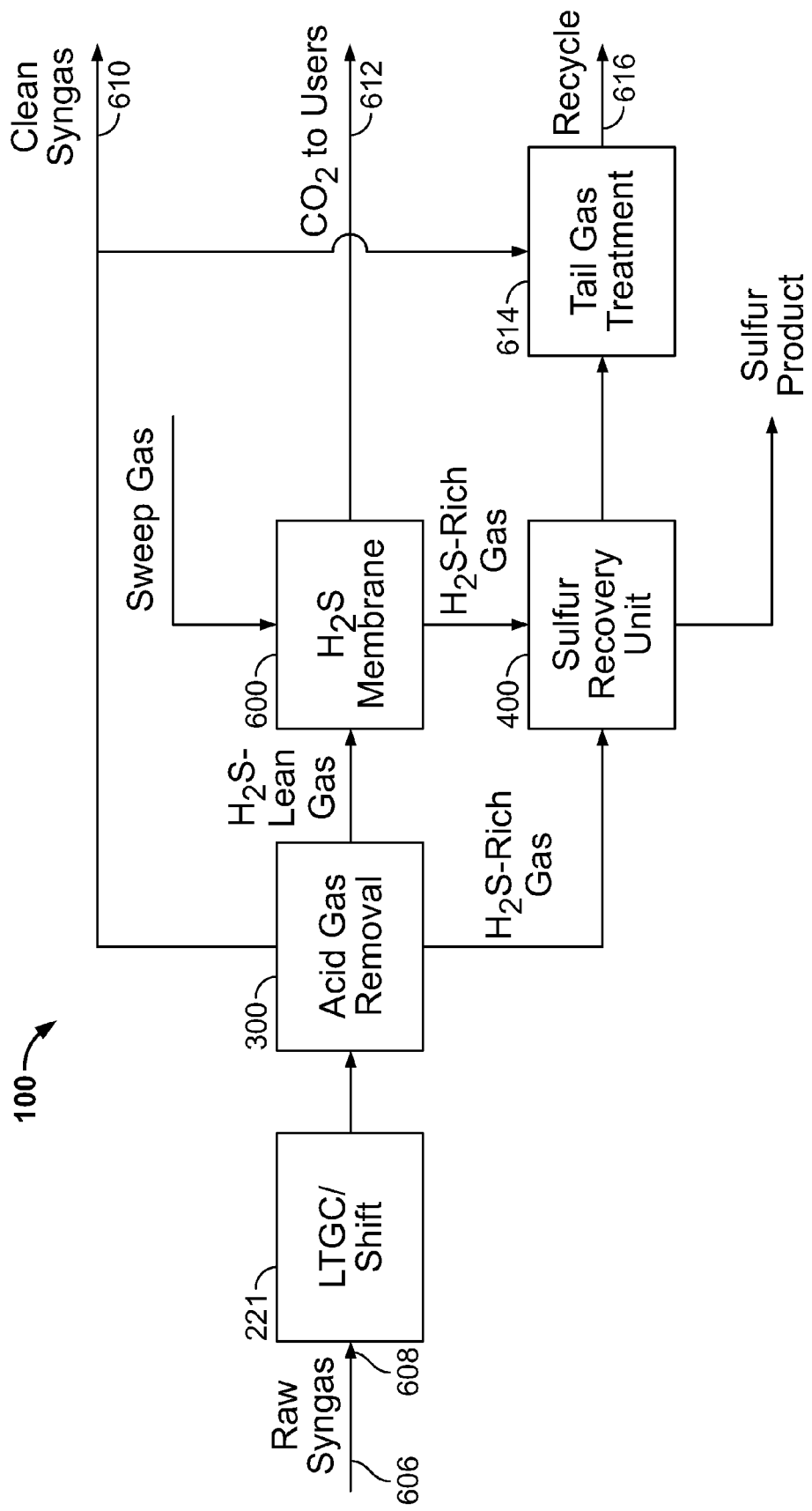

FIG. 6 is a schematic block diagram of an arrangement of components of IGCC power generation plant 100 in accordance with another exemplary embodiment of the present invention. In this embodiment, a flow of raw syngas 606 is directed to an inlet 608 of LTGC 221. A flow of particulate-free and cooled raw syngas is directed from LTGC 221 to AGR 300. As used herein, particulate-free refers to a flow having a substantially reduced particulate content sufficient to not adversely affect downstream components or processes. From AGR 300, a flow of clean syngas is directed to a syngas outlet 610, a flow of $H_2S$-rich gas is directed to SRU 400, and a flow of $H_2S$-lean gas is directed to $H_2S$ selective membrane separator 600. $H_2S$ selective membrane separator 600 separates the $CO_2$ and $H_2S$ in the $H_2S$-lean gas mixture, wherein the $CO_2$ is directed to a $CO_2$ outlet for use elsewhere and the $H_2S$ is directed to SRU 400. SRU 400 separates the elemental sulfur product from the flow of $H_2S$-rich gas from AGR 300 and $H_2S$ selective membrane separator 600 to produce a flow of elemental sulfur and a flow of tail gas. The elemental sulfur is recovered for use elsewhere and the flow of tail gas is treated in a tail gas treatment process 614 before being directed to a recycle process 616. In various embodiments, a polishing step is included downstream of $H_2S$ membrane 600 to facilitate removing sulfur using for example, but not limited to, Sulfatreat®.

In the exemplary embodiment, AGR 300 includes a first flash prior to stripping the solvent. The flash step is used to produce the $H_2S$-lean gas channeled to $H_2S$ membrane 600. In this embodiment, the additional components used allow for a reduced size $H_2S$ membrane as compared to the embodiments described above and a smaller more simplified AGR 300.

The method and apparatus for syngas, or syngas, production as described herein facilitates operation of integrated gasification combined-cycle (IGCC) power generation plants, and specifically, syngas production systems. Specifically, increasing hydrogen sulfide ($H_2S$) and carbonyl sulfide (COS) removal from syngas production fluid streams increases syngas production efficiency. More specifically, decreasing the concentration of $H_2S$ and COS in a carbon dioxide ($CO_2$) feed stream to a gasification reactor facilitates decreasing the concentration of impurities within the clean syngas channeled to a gas turbine. Moreover, configuring an integral absorber to remove $H_2S$ and COS on a substantially continuous basis as described herein facilitates optimally operating the syngas production process to facilitate improving IGCC plant production efficiency, thereby facilitating a reduction in operating costs. Furthermore, such method of continuously maintaining the absorber in service and modulating the flow of the associated gas streams facilitates avoidance of undue emissions release since the reduced concentrations of $H_2S$ and COS facilitate increased operational margins to environmental compliance limits of these compounds. Also, the method and equipment for producing such syngas as described herein facilitates reducing capital costs associated with fabricating such IGCC plant.

Exemplary embodiments of syngas production as associated with IGCC plants are described above in detail. The methods, apparatus and systems are not limited to the specific embodiments described herein or to the specific illustrated IGCC plants. Moreover, such methods, apparatus and systems are not limited to IGCC plants and may be embedded within facilities that include, but are not limited to, hydrogen production, Fischer-Tropsch fuel production processes, as well as gasification systems, synthetic natural gas systems, and gas cleaning systems generally.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A carbon capture system comprising:
an acid gas removal (AGR) subsystem configured to generate a flow of reduced acid gas content syngas, a flow of hydrogen sulfide (H2S) lean gas, and a first flow of H2S-rich gas from a stream of particulate-free raw syngas;
an H2S selective membrane separator, said H2S selective membrane separator oriented downstream from said AGR subsystem, said H2S selective membrane separator configured to separate the flow of H2S-lean gas from the AGR into a second flow of H2S-rich gas and a flow of CO2 gas;
a sulfur recovery unit (SRU) coupled in flow communication with said H2S membrane separator downstream of said membrane separator, said SRU configured to generate a flow of elemental sulfur and a flow of tail gas from the first flow of H2S-rich gas and the second flow of H2S-rich gas; and
a scrubbing and conversion unit coupled in flow communication upstream from at least one of said membrane separator and said acid gas removal subsystem, wherein said scrubbing and conversion unit includes at least one of a scrubber, a cooler, and a shift conversion reactor.

2. A carbon capture system comprising:
an acid gas removal (AGR) subsystem configured to generate a flow of reduced acid has content syngas, a flow of hydrogen sulfide ($H_2S$) lean gas, and a first flow of $H_2S$-rich gas from a stream of particulate-free raw syngas;
an $H_2S$ selective membrane separator, said $H_2S$ selective membrane separator oriented downstream from said AGR subsystem, said $H_2S$ selective membrane separator configured to separate the flow of $H_2S$-lean gas from the AGR into a second flow of $H_2S$-rich as and a flow of $CO_2$ gas;
a sulfur recovery unit SRU coupled in flow communication with said $H_2S$ membrane separator downstream of said membrane separator, said SRU configured to generate a flow of elemental sulfur and a flow of tail gas from the first flow of $H_2S$-rich gas and the second flow of $H_2S$-rich gas; and a shift reactor coupled in flow communication upstream from at least one of said membrane separator and said acid gas removal subsystem, said shift reactor configured to produce hydrogen ($H_2$) gas.

3. A system in accordance with claim 2, further comprising a carbonyl sulfide (COS) hydrolysis unit coupled in flow communication upstream from at least one of said membrane separator and said acid gas removal subsystem, said COS hydrolysis unit configured to produce $H_2S$ and carbon dioxide ($CO2$).

4. A system in accordance with claim 1, wherein said acid gas removal subsystem comprises a CO2-selective membrane element.

5. A method of capturing CO2 from a flow of raw synthesis gas generated in a gasification system, said method comprising:
channeling the flow of raw syngas to a scrubbing and conversion unit coupled in flow communication upstream from at least one of a H2S selective membrane separator and an acid gas removal unit (AGR), wherein the scrubbing and conversion unit includes at least one of a scrubber, a cooler, and a shift conversion reactor;
receiving a flow discharged from the scrubbing and conversion unit comprising CO2 at an inlet of at least one of the H2S selective membrane separator and the acid gas removal unit (AGR);
separating relatively clean synthesis gas from at least one of the flow of synthesis gas and a flow of H2S-lean synthesis gas using the AGR;
separating the flow of at least one of synthesis gas and acid gas into a flow of H2S-rich gas and a flow of H2S-lean gas using a H2S selective membrane separator; and
separating sulfur from the H2S-rich gas using a sulfur recovery unit (SRU).

6. A method of capturing CO2 from a flow of raw synthesis gas generated in a gasification system, said method comprising:
receiving the flow of raw synthesis gas comprising CO2 at an inlet of at least one of a H2S selective membrane separator and an acid gas removal unit (AGR);
separating relatively clean synthesis gas from at least one of the flow of raw synthesis gas and a flow of H2S-lean synthesis gas using the AGR;
separating the flow of at least one of raw synthesis gas and acid gas into a flow of H2S-rich gas and a flow of H2S-lean gas using a H2S selective membrane separator;
separating sulfur from the H2S-rich gas using a sulfur recovery unit (SRU); and
channeling a flow of acid gas from the AGR to the H2S selective membrane separator.

7. A method in accordance with claim 6, further comprising channeling the flow of H2S-rich gas from the H2S selective membrane separator to the SRU.

8. A method in accordance with claim 5, channeling a flow of CO2 from at least one of the H2S selective membrane separator and the AGR after the flow of CO2 has passed through both of the H2S selective membrane separator and the AGR.

9. A method in accordance with claim 6, wherein separating sulfur from the H2S-rich gas using an SRU comprises:
generating a flow of tail gas; and
recycling the flow of tail gas to at least one of a gasifier, an AGR, an SRU, the H2S selective membrane separator, and a shift reactor through a hydrogenation unit.

10. A gasification system comprising:
a gasifier configured to generate a flow of fuel gas comprising acid gas;
an acid gas removal subsystem (AGR) coupled in flow communication with said gasifier and configured to remove at least a portion of acid gas from the flow of fuel gas;
a membrane separator coupled in flow communication with said acid gas removal subsystem, said membrane separator oriented at least one of upstream and downstream in a direction of the flow of fuel gas from said acid gas removal subsystem, said membrane separator configured to separate hydrogen sulfide (H2S) gas from the flow of fuel gas to generate a flow of H2S-rich gas and a flow of H2S-lean gas; and
a sulfur recovery unit (SRU) coupled in flow communication with said membrane separator downstream of said membrane separator, said SRU configured to remove sulfur from the flow of H2S-rich gas.

11. A system in accordance with claim 10, wherein said membrane separator comprises a H2S-selective membrane.

12. A system in accordance with claim 10, further comprising a shift reactor coupled in flow communication upstream from at least one of said membrane separator and said acid gas removal subsystem, said shift reactor configured to produce hydrogen gas.

13. A system in accordance with claim 10, further comprising a carbonyl sulfide (COS) hydrolysis unit coupled in flow communication upstream from at least one of said membrane separator and said acid gas removal subsystem, said COS hydrolysis unit configured to produce H2S and CO2.

14. A system in accordance with claim 10, wherein said SRU is configured to generate elemental sulfur and a flow of tail gas from the flow of H2S rich gas.

15. A system in accordance with claim 14, wherein the flow of tail gas comprises at least one of hydrogen sulfide (H2S), sulfur dioxide (SO2), and carbon dioxide (CO2) and wherein the tail gas is channeled to a hydrogenation unit configured to generate a flow of treated tail gas comprising H2S.

16. A system in accordance with claim 15, wherein the flow of treated tail gas is channeled to at least one of a gasifier, an AGR, an SRU, the H2S selective membrane separator, and a shift reactor.

17. A system in accordance with claim 10, wherein said membrane separator comprises membrane element and a sweep gas inlet configured to receive a flow of sweep gas.

18. A system in accordance with claim 17, wherein said sweep gas inlet is configured to channel a flow of sweep gas to a relatively low pressure side of the membrane element.

19. A system in accordance with claim 17, wherein said sweep gas inlet is configured to channel a flow of sweep gas comprising at least one of CO2, nitrogen gas (N2), and fuel gas to a relatively low pressure side of the membrane element.

20. A system in accordance with claim 10, wherein said acid gas removal subsystem comprises a CO2-selective membrane element.

* * * * *